C. A. DEAN.
REGISTER ADAPTED TO BE APPLIED TO THE FLOORS OR FOOTBOARDS OF AUTOMOBILES.
APPLICATION FILED JAN. 13, 1919.
1,387,131. Patented Aug. 9, 1921.
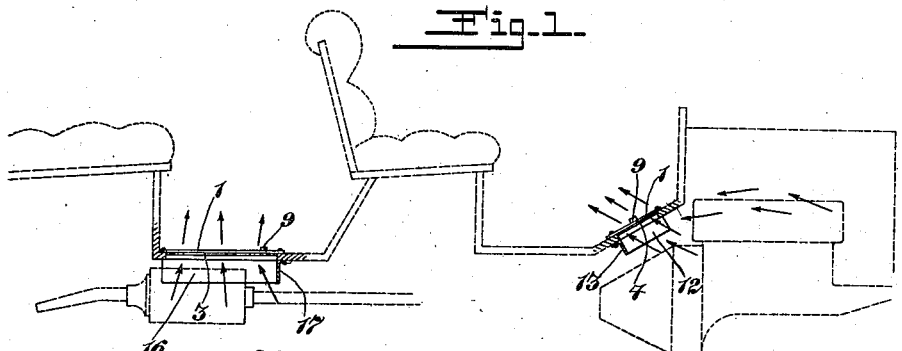
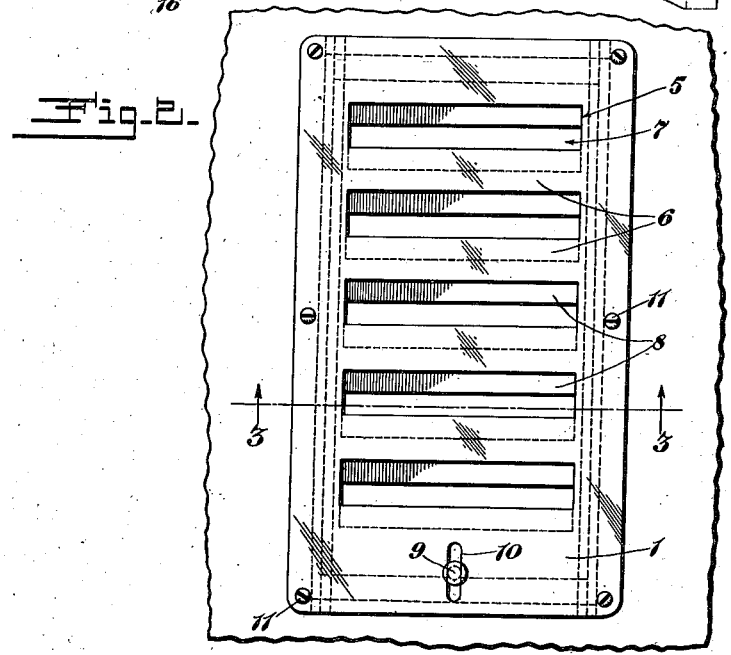
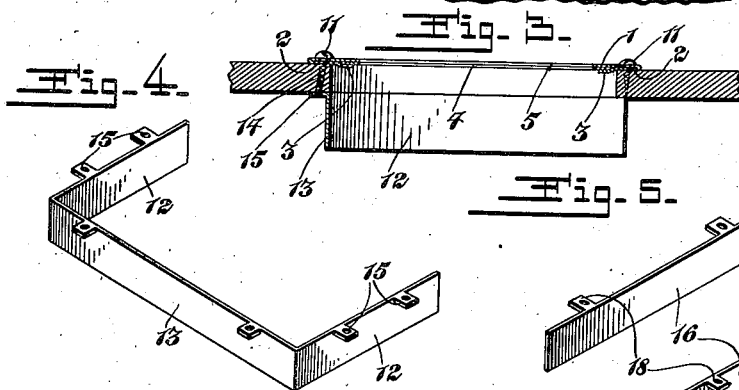

UNITED STATES PATENT OFFICE.

CLARK A. DEAN, OF ST. LOUIS, MISSOURI, ASSIGNOR, BY MESNE ASSIGNMENTS, TO STARK-INLAND MACHINE WORKS, OF ST. LOUIS, MISSOURI, A CORPORATION OF MISSOURI.

REGISTER ADAPTED TO BE APPLIED TO THE FLOORS OR FOOTBOARDS OF AUTOMOBILES.

1,387,131.          Specification of Letters Patent.          Patented Aug. 9, 1921.

Application filed January 13, 1919. Serial No. 270,808.

*To all whom it may concern:*

Be it known that I, CLARK A. DEAN, a citizen of the United States, residing at the city of St. Louis and State of Missouri, have invented a new and useful Improvement in Registers Adapted to be Applied to the Floors or Footboards of Automobiles, of which the following is a specification.

This invention relates to heating registers. The invention has particular reference to registers adapted to be applied to the floor or foot-board of an automobile for the purpose of delivering heat from the engine or exhaust of the automobile through the floor thereof.

An object of the invention is to provide an efficient device of the character mentioned of strong and durable construction which may be readily applied to the floor or foot-board of an automobile and which is effective to control the passage of heated air from the engine or exhaust into the automobile body.

With the foregoing and other objects which will appear from the following description in view, I have produced an efficient form of my invention and have illustrated the same in the accompanying drawings, in which—

Figure 1 is a view showing one of the devices applied to the foot-board of an automobile for delivering heat from the engine, and another device applied to the floor of the tonneau for delivering heat into the tonneau from the exhaust.

Fig. 2 is an enlarged plan view of the device.

Fig. 3 is a sectional view on the line 3—3 of Fig. 2.

Fig. 4 is a perspective view of a device which may be used to divert heated air from the engine through the register applied to the foot-board.

Fig. 5 is a perspective view of a device which may be used in connection with the register applied to the floor of the tonneau to assist in the passage of heated air from the exhaust.

As shown, the top plate 1 of the register has its edge portions 2 folded under and for a short distance from the folded line pressed closely against the under side of the top plate. The extreme edge portions 3 are spaced a slight distance from the top plate and constitute a support for the slide or shutter 4 which is freely movable to different adjusted positions.

The top plate is formed with a number of openings 5 separated by integral portions 6 of the top plate which are at least as wide as the openings 5. The slide or shutter 4 is also formed with a number of openings 7 separated by integral portions 8 of the slide or shutter which are at least as wide as the openings 5 through the top plate. The slide or shutter is movable to any desired adjusted position relative to the top plate; that is to say, the slide may be moved to position to register the openings 7 therethrough partially only, or entirely with the openings 5 through the top plate and thus regulate and vary the quantity of heated air that may pass through the register; or, the slide or shutter may be moved to position in which the portions 8 thereof will entirely close the openings 5 and thus prevent the passage of any appreciable quantity of air through the register.

The slide or shutter is provided with a projection 9 which extends through a slot 10 in the top plate and which affords means whereby the slide or shutter may be moved to any of its adjusted positions. It is preferable that the slide or shutter shall fit snugly within the support formed by the edges 3 of the top plate, so that the shutter will not be moved or displaced from its desired adjustment by the ordinary vibration of the automobile when in motion.

The register is applied across an appropriate opening formed for that purpose in the foot-board or floor of the automobile as shown. The folded edges of the top plate bear upon the floor or foot-board around the opening therethrough leaving the supports 3 within the opening. The register may be secured in position by screws or other fastening elements 11.

In order to cause the passage of heated air from the engine through the register applied to the foot-board a diverting device of appropriate construction such, for instance, as that illustrated in Fig. 4 may be employed.

As shown the diverting device consists of a section of sheet metal bent to provide side walls 12 and a connecting wall 13. The side walls 12 extend at the sides of the opening through the foot-board, and the connecting wall 13 extends across the rear side of the opening so that the heated air from the engine will be caused to pass through the register. The diverting device may be supported in connection with the underside of the foot-board by screws or nails 14 passing through ears 15 in connection with the side and rear walls of the device.

The heated air from the exhaust may be enabled to pass through the register into the tonneau of the automobile by an appropriate device provided for that purpose. As shown in Fig. 5 this device may include side walls 16 and a connecting wall 17 supported in connection with the under side of the floor by fastening elements passing through ears 18. The side walls 16 extend along the sides of the opening through the floor and the connecting wall 17 extends across the front side of the opening, thus preventing the passage of cold air through the register and permitting heated air from the exhaust to rise and pass therethrough.

From the foregoing it will be understood that the device which I have provided serves its purpose efficiently. The device is comparatively inexpensive in construction and may be applied to automobiles of well known construction.

I do not restrict myself to unessential details or features of construction, but what I claim and desire to secure by Letters Patent, is:—

1. A device of the character described, comprising a top plate composed of sheet metal having its side edges folded against the under side thereof for a distance inwardly from the folds constituting reinforced supporting sides for the device, said top plate having a number of openings through the central portion thereof between the folded edges; supports composed of portions integral with the folded side edges of the top plate spaced from the top plate to support the slide; and a slide supported upon said spaced supporting portions and between said portions and the under side of the top plate, and having openings therethrough movable into and out of registration with the holes through the top plate.

2. A device of the character described, comprising a top plate composed of sheet metal having its side edges folded against the under side thereof for a distance inwardly from the folds and having a number of openings through the central portion thereof between the folded edges; the inwardly bent folds at a point near their free ends being spaced from the under side of the plate to constitute supports and a slide supported upon said spaced supporting portions and between said portions and the under side of the top plate, and having openings therethrough movable into and out of registration with the openings through the top plate; and means for moving said slide to different adjusted positions.

3. A device of the character described, comprising a top plate composed of sheet metal having its side edges folded and pressed against the under side thereof for a distance inwardly from the folds and having a number of openings through the central portion thereof between the folded edges; supports composed of the marginal portions of the folded side edges of the top plate spaced from the top plate to support the slide; a slide supported upon said spaced supporting portions and between said portions and the under side of the top plate, and having openings therethrough movable into and out of registration with the openings through the top plate; means for moving said slide to different adjusted positions; and a device for deflecting air through the register.

4. A device of the character described, comprising a relatively flat top plate extending across an opening in a floor board and having a plurality of integral cross members extending from the marginal portions of the plate, said plate having rebent folds reinforcing marginal portions thereof and for a portion of their length lying in contact with the under sides of the plate and engaging the surface of the floor board, said rebent folds from a point near their outer ends being spaced from the bottom of the marginal side parts of the plate to provide receiving and guiding pockets, a movable slide beneath said plate, said slide having side portions disposed within the space between the marginal folds of the plate, and adapted to be moved into and out of registration with the cross pieces thereof.

5. A device of the character described, comprising a relatively flat top plate extending across an opening in a floor board and having a plurality of integral cross members extending from the marginal portions of the plate, said plate having rebent folds reinforcing marginal portions thereof and for a portion of their length lying in contact with the under sides of the plate and engaging the surface of the floor board, said rebent folds from a point near their outer ends being spaced from the bottom of the marginal side parts of the plate to provide receiving and guiding pockets, a movable slide beneath said plate, said slide having side portions disposed within the space between the marginal folds of the plate, and adapted to be moved into and out of registration with the cross pieces thereof, in combination with means disposed at right angles to the plate and directly underlying the same for deflecting air through the openings in said plate.

6. A device of the character described, comprising a relatively flat top plate extending across an opening in a floor board and having a plurality of integral cross members extending from the marginal portions of the plate, said plate having rebent folds reinforcing marginal portions thereof and for a portion of their length lying in contact with the under sides of the plate and engaging the surface of the floor board, said rebent folds from a point near their outer ends being spaced from the bottom of the marginal side parts of the plate to provide receiving and guiding pockets, a movable slide beneath said plate, said slide having side portions disposed within the space between the marginal folds of the plate, and adapted to be moved into and out of registration with the cross pieces thereof, in combination with means disposed at right angles to the plate and directly underlying the same for deflecting air through the openings in said plate, said means comprising a relatively flat deflector having side portions and outstanding ears for attaching the deflector to the floor board.

CLARK A. DEAN.